(12) United States Patent
Naka et al.

(10) Patent No.: US 12,245,553 B2
(45) Date of Patent: Mar. 11, 2025

(54) BLOWER

(71) Applicant: MAKITA CORPORATION, Anjo (JP)

(72) Inventors: Shinsuke Naka, Anjo (JP); Ryoji Zama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 55 days.

(21) Appl. No.: 18/300,029

(22) Filed: Apr. 13, 2023

(65) Prior Publication Data

US 2023/0337600 A1 Oct. 26, 2023

(30) Foreign Application Priority Data

Apr. 20, 2022 (JP) ................................ 2022-069627

(51) Int. Cl.
| | |
|---|---|
| *A01G 20/47* | (2018.01) |
| *F04D 19/00* | (2006.01) |
| *F04D 25/06* | (2006.01) |
| *F04D 29/52* | (2006.01) |
| *F04D 29/58* | (2006.01) |
| *H02K 5/20* | (2006.01) |

(Continued)

(52) U.S. Cl.
CPC ........... *A01G 20/47* (2018.02); *F04D 19/002* (2013.01); *F04D 25/06* (2013.01); *F04D 29/522* (2013.01); *F04D 29/5813* (2013.01); *F04D 29/582* (2013.01); *H02K 5/207* (2021.01); *H02K 9/06* (2013.01); *H02K 11/33* (2016.01); *H02K 2211/03* (2013.01)

(58) Field of Classification Search
CPC ....... A01G 20/47; F04D 19/002; F04D 25/06; F04D 29/522; F04D 29/5813; F04D 29/582; F04D 25/0606; F04D 25/0673; F04D 25/0693; F04D 25/082; F04D 25/084; F04D 29/5806; F04D 25/08; H02K 5/207; H02K 9/06; H02K 11/33; H02K 2211/03
See application file for complete search history.

(56) References Cited

U.S. PATENT DOCUMENTS

| | | | |
|---|---|---|---|
| 6,208,052 B1 * | 3/2001 | Kershaw | ............... F04D 29/582 310/67 R |
| 8,251,674 B1 * | 8/2012 | Pairaktaridis | ....... F04D 25/0613 310/67 R |

(Continued)

FOREIGN PATENT DOCUMENTS

JP 2020-076355 A 5/2020

*Primary Examiner* — David N Brandt
(74) *Attorney, Agent, or Firm* — Sughrue Mion, PLLC

(57) ABSTRACT

A blower may include an inlet, an outlet, an airflow pipe disposed between the inlet and the outlet, a fan disposed in the airflow pipe, an electric motor disposed in the airflow pipe and configured to drive the fan, a motor housing that is disposed in the airflow pipe and houses the electric motor, and a control unit configured to control the electric motor. The control unit includes a control board configured to control the electric motor and a casing that houses the control board. The airflow pipe may include an exposure hole connecting inside of the airflow pipe to outside of the airflow pipe such that the inside and the outside are in communication in a radial direction. The casing may be attached to the airflow pipe such that at least part of the casing covers an entirety of the exposure hole from outside in the radial direction.

9 Claims, 14 Drawing Sheets

(51) Int. Cl.
*H02K 9/06* (2006.01)
*H02K 11/33* (2016.01)

(56) References Cited

U.S. PATENT DOCUMENTS

| | | | |
|---|---|---|---|
| 2012/0243177 A1* | 9/2012 | Pal | F04D 25/068 |
| | | | 165/122 |
| 2015/0143657 A1* | 5/2015 | Gindele | A47L 9/322 |
| | | | 15/330 |
| 2016/0345714 A1* | 12/2016 | Yamaoka | B25F 5/02 |
| 2017/0021489 A1* | 1/2017 | Bylund | F04D 19/002 |
| 2019/0226491 A1* | 7/2019 | Kanai | F04D 29/051 |
| 2020/0137966 A1* | 5/2020 | Suzuki | F04D 29/584 |
| 2022/0252076 A1* | 8/2022 | Lee | F04D 29/5813 |

\* cited by examiner though for practicing aspects of the present teachings and is not intended to limit the scope of the present disclosure. Only the claims define the scope of the claimed disclosure.

BLOWER

REFERENCE TO RELATED APPLICATIONS

This application claims priority from Japanese Patent Application No. 2022-69627 filed on Apr. 20, 2022. The entire content of the priority application is incorporated herein by reference.

TECHNICAL FIELD

The technique disclosed herein relates to a blower.

BACKGROUND ART

Japanese Patent Application Publication No. 2020-076355 describes a blower including an inlet, an outlet, an airflow pipe disposed between the inlet and the outlet, a fan disposed in the airflow pipe, an electric motor disposed in the airflow pipe and configured to drive the fan, a motor housing that is disposed in the airflow pipe and houses the electric motor, and a control unit configured to control the electric motor. The control unit includes a control board which controls the electric motor and a casing that houses the control board. The airflow pipe includes a cooling air path connecting inside and outside of the airflow pipe such that the inside and the outside are in communication. The control unit is arranged inside the cooling air path such that is does not entirely close the cooling air path.

DESCRIPTION

It is necessary in a blower including a control unit to cool the control unit in order to suppress temperature increase of the control unit caused by heat generation of a control board. The blower of Japanese Patent Application Publication No. 2020-076355 includes the cooling air path to cool the control unit in addition to an airflow path. In this case, by providing the cooling air path, a structure of the blower could become complicated and a size of the blower could increase. The present disclosure provides a technique which does not require a cooling air path separately from an airflow path and thus which can simplify a structure of a blower and downsize the blower. In the present disclosure, the term "airflow path" means a path which is defined inside an airflow pipe and extends from one end to the other end of the airflow pipe. The term "blowing air" means air exhausted from an outlet along the airflow path.

A blower disclosed herein may comprise an inlet, an outlet, an airflow pipe disposed between the inlet and the outlet, a fan disposed in the airflow pipe, an electric motor disposed in the airflow pipe and configured to drive the fan, a motor housing that is disposed in the airflow pipe and houses the electric motor, and a control unit configured to control the electric motor. The control unit may comprise a control board configured to control the electric motor and a casing that houses the control board. The airflow pipe may comprise an exposure hole connecting inside of the airflow pipe to outside of the airflow pipe such that the inside and the outside are in communication in a radial direction. The casing may be attached to the airflow pipe such that at least part of the casing covers an entirety of the exposure hole from outside in the radial direction.

According to the above configuration, the casing is attached to the airflow pipe such that it covers the entirety of the exposure hole. In this configuration, the at least part of the casing is exposed to the airflow path through the exposure hole defined in the airflow pipe. Thus, the air flowing along the airflow path cools the control unit, and all the air used for the cooling is exhausted as blowing air. According to the above configuration, it is not necessary to provide a cooling air path for cooling the control unit separately from an airflow path, and thus a structure of the blower can be simplified and the blower can be downsized.

Figure 1:
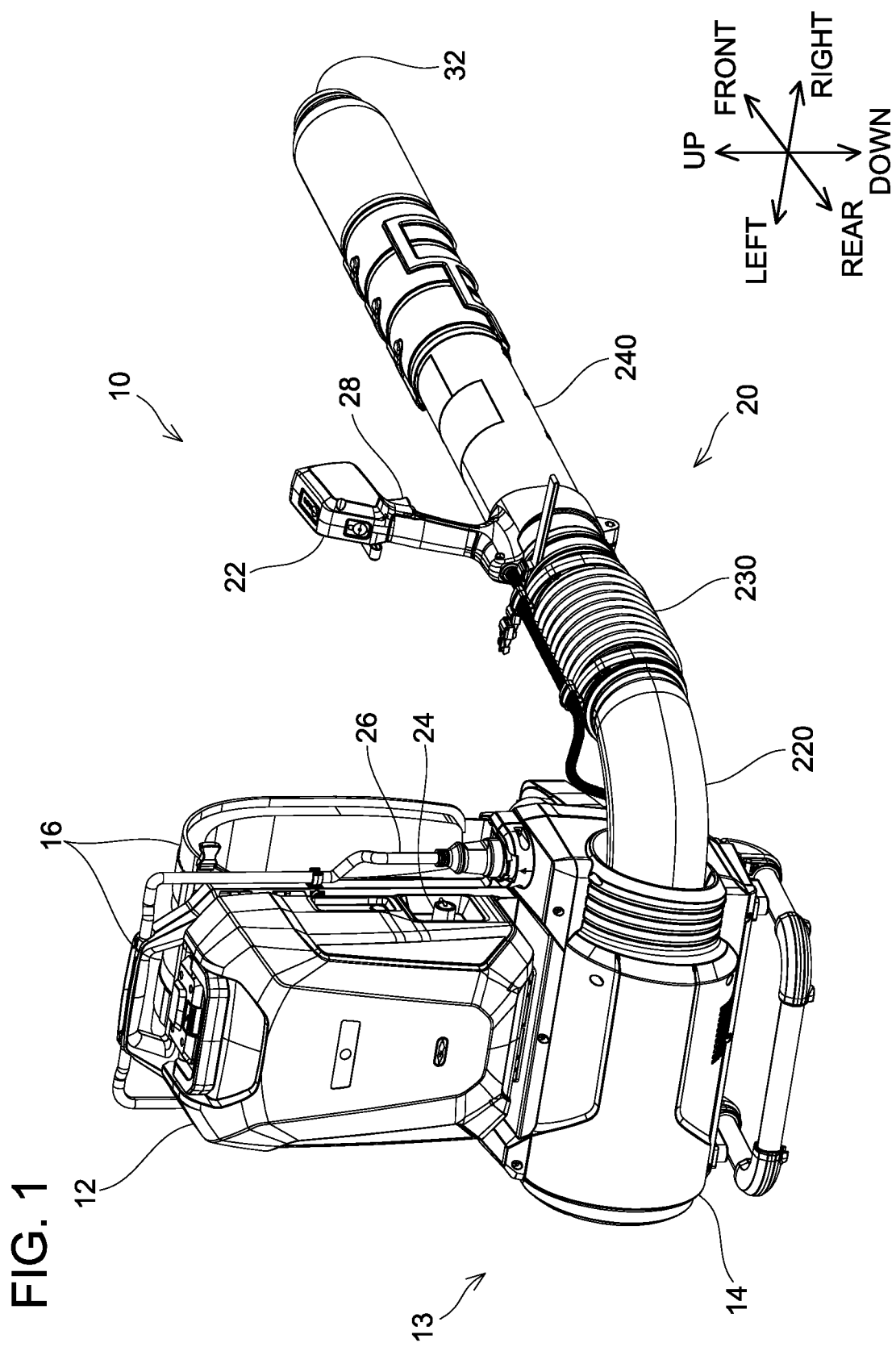
FIG. 1 is a perspective view of an entirety of a blower 10 of an embodiment, viewed from the rear right upper side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved blowers as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the airflow pipe and the motor housing may be constituted of resin. The at least part of the casing may be constituted of a metallic material.

In order to efficiently cool the control unit, it is desirable to use a material having high heat conductivity for a part of the casing housing the control board, the part being exposed to the airflow path. On the other hand, in order to reduce a mass of the blower as a whole, it is desirable to use a material having a small mass for the airflow pipe and the motor housing. According to the above configuration, the at least part of the casing exposed to the airflow path is constituted of a metallic material having high heat conductivity. The airflow pipe and the motor housing are constituted of resin having a small mass. Consequently, the control unit can efficiently be cooled and also reduction of a weight of the blower as a whole can be achieved.

In one or more embodiments, the at least part of the casing may be offset outwardly in the radial direction from a virtual surface, wherein the virtual surface extends along an inner surface of the airflow pipe at a part where the exposure hole is defined. Here, when the inner surface of the airflow pipe is a cylindrical surface, the "virtual surface" means a surface extending along the cylindrical surface.

When the casing is offset inwardly from the virtual surface in the radial direction of the airflow pipe, the airflow path is narrowed at the part where the casing is disposed, thus pressure loss may increase in the airflow path. According to the above configuration, the airflow path will not be narrowed at the part where the casing is disposed. Consequently, increase in pressure loss in the airflow path can be suppressed.

In one or more embodiments, in the radial direction, a distance between the at least part of the casing and the virtual surface may be within a range of 2 mm to 12 mm.

In general, when the distance between the casing and the virtual surface is smaller, the control unit can more efficiently be cooled by the air flowing in the airflow path. According to the above configuration, the control unit can efficiently be cooled.

In one or more embodiments, when the exposure hole is viewed from outside in the radial direction, the electric motor and the exposure hole may at least partially overlap.

For example, if the electric motor and the exposure hole do not overlap when the exposure hole is viewed from outside in the radial direction, the airflow pipe may become excessively long. According to the above configuration, the electric motor and the exposure hole at least partially overlap when the exposure hole is viewed from outside in the radial direction, thus the airflow pipe can be shortened.

In one or more embodiments, the fan may be an axial flow fan whose blowing direction is along a rotation axis of the fan. The rotation axis of the fan may be arranged along a direction in which the airflow pipe extends. The control board may be configured to control the electric motor so that an upstream side of the blowing direction is an inlet side and a downstream side of the blowing direction is an outlet side. The exposure hole may be disposed downstream from the fan.

In general, a flow rate of air flowing in the airflow path is larger at a position downstream from the axial flow fan than a position upstream therefrom. According to the above configuration, the casing of the control unit is exposed to the airflow path at a position downstream from the axial flow fan. Thus, air having a relatively large flow rate flows at the part where the control unit is exposed to the airflow path. According to the above configuration, the control unit can efficiently be cooled.

In one or more embodiments, the electric motor may be a brushless motor. The control board may comprise a plurality of switching elements configured to control current supplied to the electric motor.

In general, when the electric motor is a brushless motor, a plurality of switching elements configured to control current supplied to the brushless motor is disposed on the control board. In this case, due to heat generation by the plurality of switching elements, an amount of heat generated by the control unit relatively increases. According to the above configuration, in the blower including the brushless motor, the control unit can efficiently be cooled without reducing a flow rate of blowing air.

In one or more embodiments, when the exposure hole is viewed from outside in the radial direction, the plurality of switching elements and the exposure hole may at least partially overlap.

According to the above configuration, the plurality of switching elements, which is the parts whose heat generation amount is relatively large within the control unit, and the exposure hole at least partially overlap in the radial direction of the airflow pipe. Thus, the heat generated by the plurality of switching elements tends to be dissipated to the part of the casing exposed to the airflow path. Consequently, temperature increase in the control unit as a whole can efficiently be suppressed. According to the above configuration, the control unit including the plurality of switching elements can efficiently be cooled.

EMBODIMENT

As illustrated in FIG. 1, a blower 10 includes a battery device 12, a blower body 13, and a pair of shoulder belts 16. A user wears the pair of shoulder belts 16 on his/her shoulder, by which the user can hold the blower 10 on his/her back. In other words, the blower 10 of the present embodiment is a backpack blower. In the explanation below, when the user wears the blower 10 on his/her back, an up-down direction, a left-right direction and a front-rear direction viewed from the user will be referred to as an up-down direction, a left-right direction and a front-rear direction of the blower 10.

Configuration of Battery Device 12

The battery device 12 houses a plurality of battery cells (not illustrated). The battery device 12 includes a charging connector 24 and a discharging cable 26. The discharging cable 26 is connected to the blower body 13. The plurality of battery cells can be charged from an external power source (not illustrated) by connecting a charging cable (not illustrated) extending from the external power source to the charging connector 24. The plurality of battery cells can discharge to the blower body 13 via the discharging cable 26.

Configuration of Blower Body 13

Figure 2:
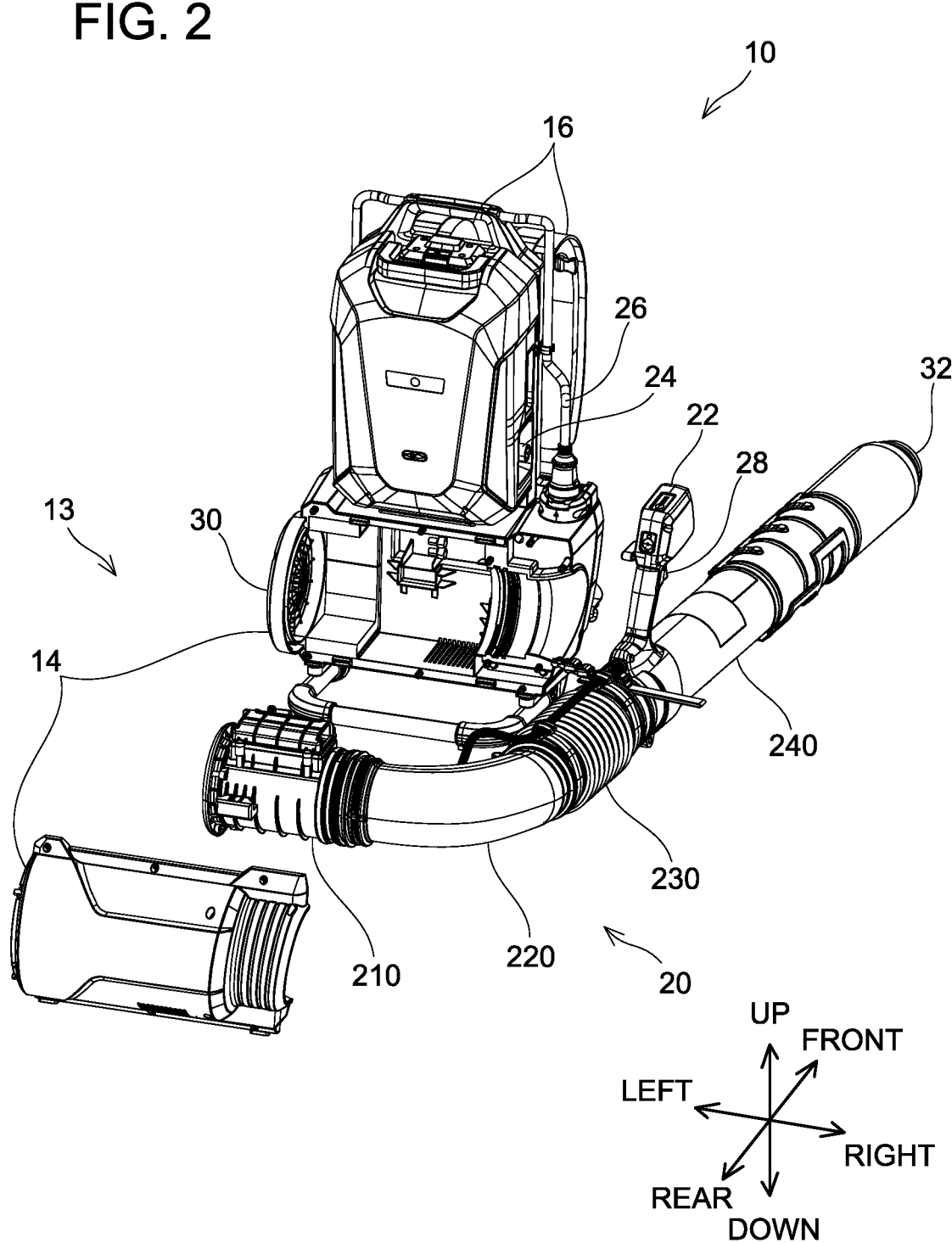
FIG. 2 is a disassembled view of a structure inside a blower body 13 of the blower 10 of the embodiment, viewed from the rear right upper side.

The blower body 13 includes an outer housing 14, an airflow pipe 20 and an operation grip 22. As illustrated in FIG. 2, the outer housing 14 includes an inlet 30 on its left side. The inlet 30 connects between the inside and outside of the outer housing 14 such that the inside and the outside are in communication. The outer housing 14 houses a part of the airflow pipe 20. The outer housing 14 holds the airflow pipe 20 such that a direction along which a first airflow pipe 210 to be described later extends is defined along the left-right direction.

Configuration of Airflow Pipe 20

The airflow pipe 20 includes a first airflow pipe 210 which is substantially cylindrical and extends in the left-right direction, a second airflow pipe 220 which is substantially cylindrical and bent toward the front as it extends rightward, a third airflow pipe 230 which has an accordion structure and extends in the front-rear direction, and a fourth airflow pipe 240 which is substantially cylindrical and extends in the front-rear direction. The third airflow pipe 230 is configured to extend and contract. The first airflow pipe 210, the second airflow pipe 220, the third airflow pipe 230 and the fourth airflow pipe 240 are connected in series. The left end of the first airflow pipe 210 is directed to the inlet 30 and communicates with the inlet 30. The front end of the fourth airflow pipe 240 includes an outlet 32. As described above, the airflow pipe 20 is configured such that its one end communicates with the inlet 30 and the other end functions as the outlet 32. In the present disclosure, with respect to the direction in which the airflow pipe 20 extends, a side toward the inlet 30 may be referred to an inlet side and a side toward the outlet 32 may be referred to as an outlet side. For example, the left side of the first airflow pipe 210 may be referred to as the inlet side and the right side of the first airflow pipe 210 may be referred to as the outlet side.

Configuration of Operation Grip 22

As illustrated in FIG. 1, an operation grip 22 is disposed on the fourth airflow pipe 240 at a position which allows the user to operate the operation grip 22 by gripping it. The user adjusts a posture of the fourth airflow pipe 240 while gripping the operation grip 22, by which the user can adjust a direction in which the outlet 32 is oriented. A plurality of switches, such as a trigger 28, to be operated by the user is disposed on the operation grip 22.

Configuration of Airflow Unit 50

Figure 3:
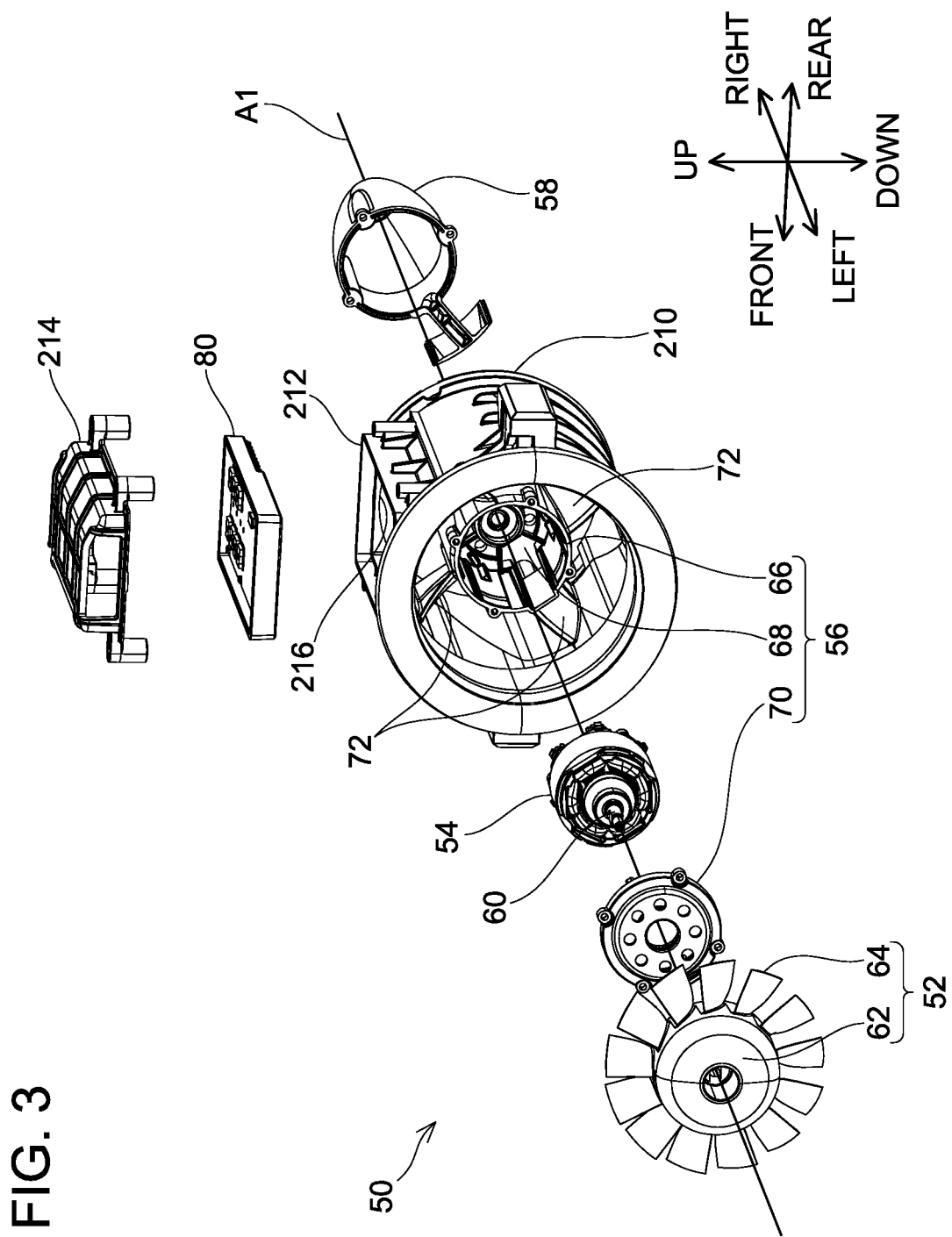
FIG. 3 is a disassembled view of an airflow unit 50 and a control unit 80 disposed on a first airflow pipe 210 and components of the airflow unit 50 of the blower 10 of the embodiment.

As illustrated in FIG. 3, the blower body 13 further includes an airflow unit 50 disposed in the airflow pipe 20 and configured to supply air from the inlet 30 toward the outlet 32 through the airflow pipe 20. The airflow unit 50 includes a fan 52, an electric motor 54 configured to drive the fan 52, a motor housing 56 that houses the electric motor 54, and a diffuser cone 58 connected to the right end of the motor housing 56.

Configuration of Electric Motor 54

The electric motor 54 includes a drive shaft 60 configured to rotate about a rotation axis A1 which is along the left-right direction. The electric motor 54 of the present embodiment is a brushless motor and includes a stator and a rotor (not illustrated). The drive shaft 60 is fixed to the rotor, and the drive shaft 60 rotates about the rotation axis A1 when electric power is supplied to the electric motor 54.

Configuration of Fan 52

Figure 4:
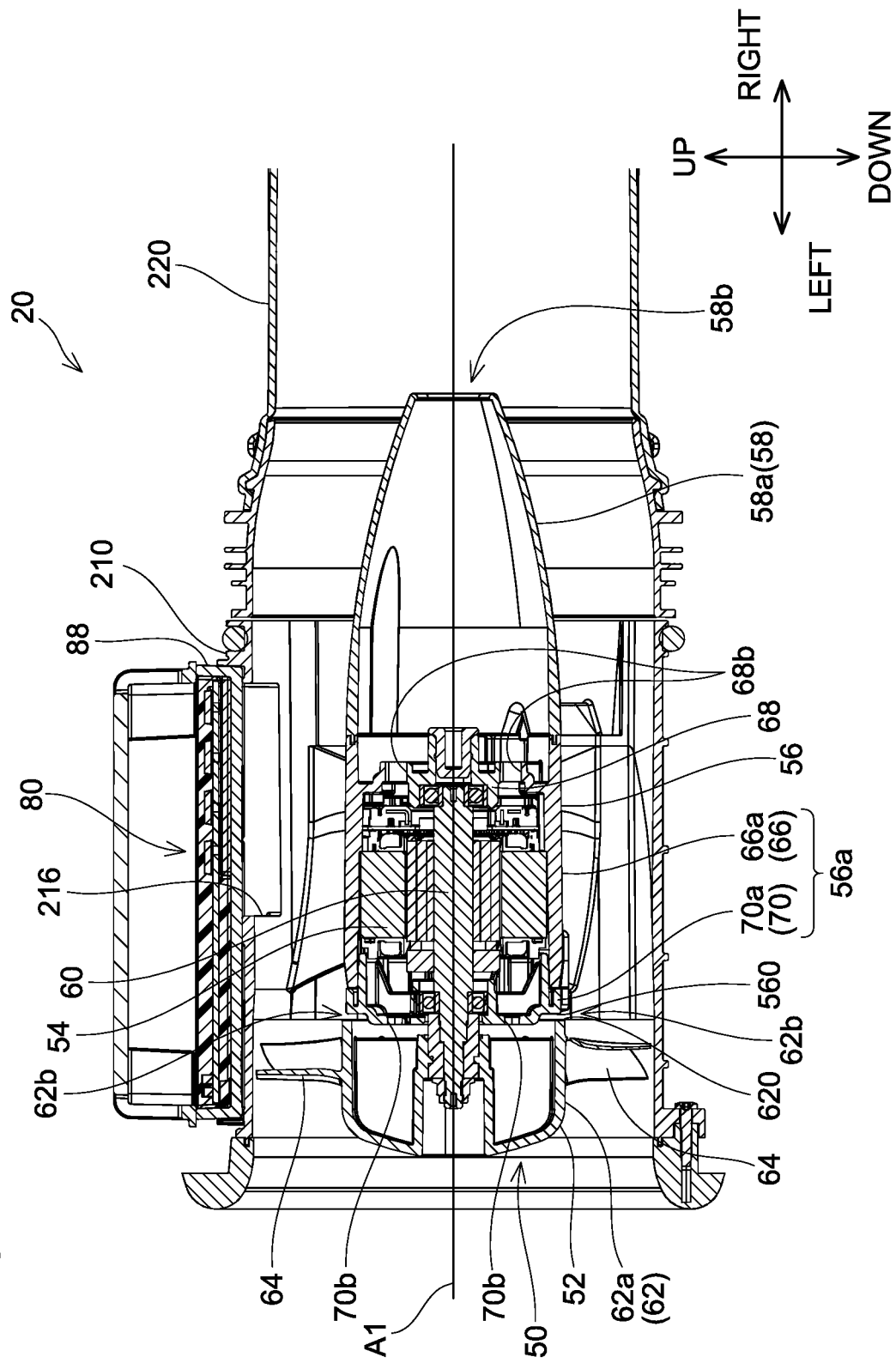
FIG. 4 is a cross-sectional view illustrating internal structures of the first airflow pipe 210, the airflow unit 50 and the control unit 80 of the blower 10 of the embodiment.

As illustrated in FIG. 4, the fan 52 includes a hub 62 fixed to the drive shaft 60 from the inlet side and a plurality of blades 64 disposed at a first outer surface 62a of the hub 62. The hub 62 is configured to rotate about the rotation axis A1. The first outer surface 62a has an axisymmetric shape about the rotation axis A1 of the drive shaft 60. An outlet-side end 620, which is the end of the first outer surface 62a on the outlet side, has a first outer diameter φ1 (see FIG. 10). In the present embodiment, the fan 52 is an axial flow fan. For example, when the fan 52 rotates counterclockwise as the airflow unit 50 is viewed from the inlet side, the fan 52 generates airflow from the inlet side toward the outlet side along the rotation axis A1 (e.g., rightward in FIG. 4).

Configuration of Motor Housing 56

As illustrated in FIG. 3, the motor housing 56 includes a cylindrical portion 66 extending along the rotation axis A1, a bottom portion 68 disposed on the outlet side of the electric motor 54, and a lid portion 70 disposed on the inlet side of the electric motor 54. The motor housing 56 is supported within the first airflow pipe 210 by a plurality of support members 72 formed at the cylindrical portion 66. The cylindrical portion 66, the bottom portion 68, the plurality of support members 72 and the first airflow pipe 210 are seamlessly and integrally formed. The lid portion 70 is fixed to the cylindrical portion 66 by screws (not illustrated). Thus, the electric motor 54 is housed in the motor housing 56 by inserting the electric motor 54 into the cylindrical portion 66 and then fixing the lid portion 70 to the cylindrical portion 66. In the present embodiment, resin such as nylon is used for the cylindrical portion 66, the bottom portion 68, the lid portion 70, the plurality of support members 72, and the first airflow pipe 210.

As illustrated in FIG. 4, the cylindrical portion 66 includes an outer surface 66a having a substantially cylindrical shape about the rotation axis A1 of the drive shaft 60. The lid portion 70 includes an outer surface 70a having an axisymmetric shape about the rotation axis A1. With the lid portion 70 fixed to the cylindrical portion 66, the outer surface 66a and the outer surface 70a are substantially smoothly connected to each other along the rotation axis A1. Thus, in the present disclosure, the outer surface 66a and the outer surface 70a may collectively be referred to as "second outer surface 56a". An inlet-side end 56O, which is the end of the second outer surface 56a on the inlet side, has a second outer diameter φ2 (see FIG. 10). Here, a second vent 62b is defined between the outlet-side end 62O of the hub 62 and the inlet-side end 56O of the motor housing 56. The second vent 62b is defined along a circumferential direction of the rotation axis A1 between the outlet-side end 62O and the inlet-side end 56O. The second vent 62b has a width in the axial direction of the rotation axis A1. In view of the above, the second vent 62b is defined such that its circumferential end is constituted of the outlet-side end 62O and the inlet-side end 56O. The second vent 62b connects between the inside of the hub 62 and an airflow path R1 (see FIG. 8, to be described later) such that they are in communication.

The bottom portion 68 includes first communication holes 68b defined between the electric motor 54 and the diffuser cone 58 in the direction along which the rotation axis A1 extends. The first communication holes 68b connect between the inside of the motor housing 56 and the inside of the diffuser cone 58 such that they are in communication. In the present embodiment, the first communication holes 68b are defined with a predetermined angular interval (e.g., interval of 60 degrees) from one another in the circumferential direction. The lid portion 70 includes second communication holes 70b defined between the hub 62 and the electric motor 54 in the direction in which the rotation axis A1 extends. The second communication holes 70b connect between the inside of the hub 62 and the inside of the motor housing 56 such that they are in communication. In the present embodiment, the second communication holes 70b are defined with a predetermined angular interval (e.g., interval of 40 degrees) from one another in the circumferential direction.

Configuration of Diffuser Cone 58

Figure 12:
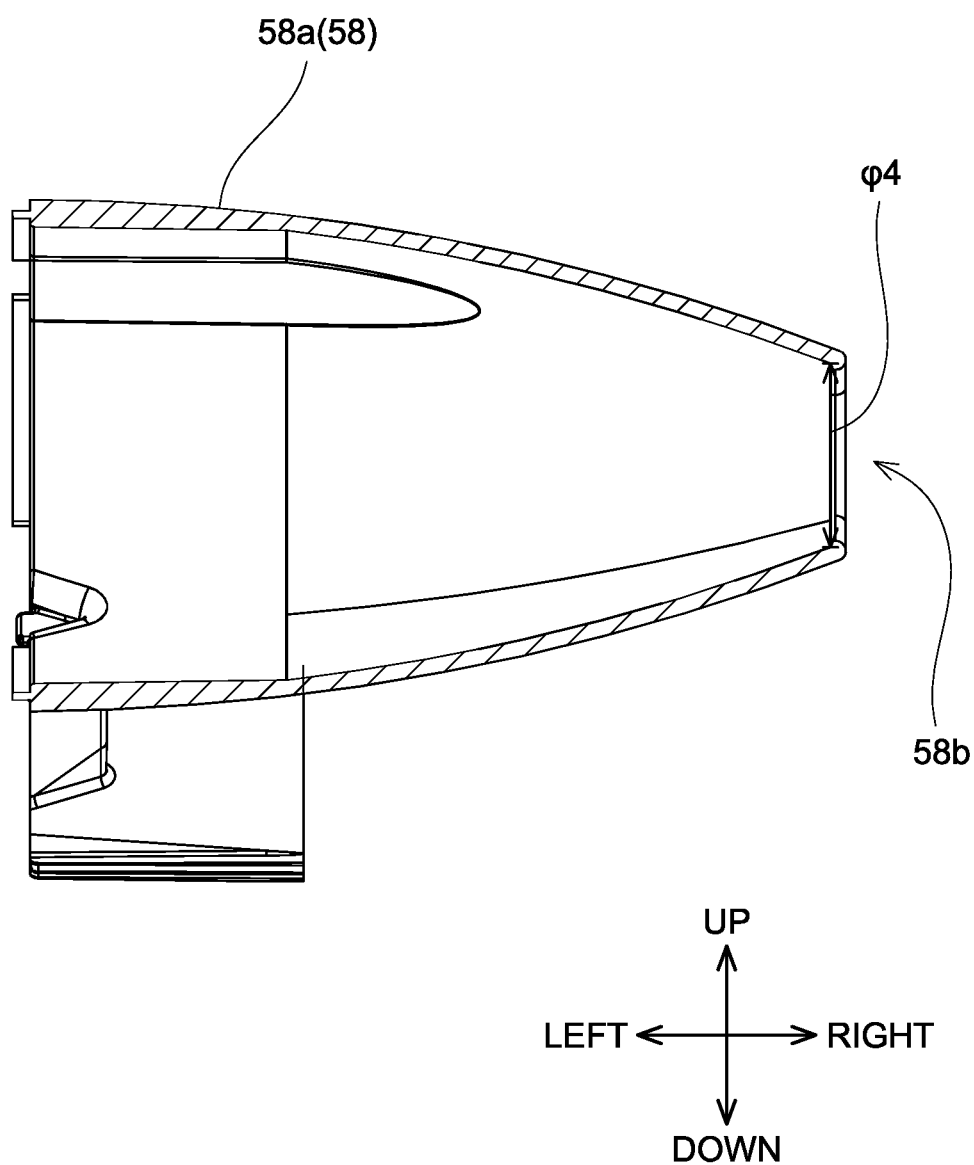
FIG. 12 is a cross-sectional view illustrating a second inner diameter $\varphi 4$ of a first vent 58b in the blower 10 of the embodiment.

The diffuser cone 58 is connected to the outlet-side end of the cylindrical portion 66 of the motor housing 56 and extends along the rotation axis A1. A part of the diffuser cone 58 extends toward the outlet side beyond the right end of the first airflow pipe 210. In other words, the diffuser cone 58 extends in both the first airflow pipe 210 and the second airflow pipe 220. The diffuser cone 58 includes a third outer surface 58a having an axisymmetric shape about the rotation axis A1. The third outer surface 58a is smoothly connected to the second outer surface 56a along the direction in which the rotation axis A1 extends. A diameter of the third outer surface 58a is reduced from the inlet side toward the outlet side along the rotation axis A1. The diffuser cone 58 includes a first vent 58b which has a substantially circular shape and whose circumferential end is the outlet-side end of the third outer surface 58a. The first vent 58b is open along the direction in which the rotation axis A1 extends. The first vent 58b has a second inner diameter φ4 (see FIG. 12). The first vent 58b connects between the airflow path R1 (see FIG. 8) to be described and the inside of the diffuser cone 58 such that they are in communication.

Configuration of Control Unit 80

As illustrated in FIG. 3, the blower body 13 further includes a control unit 80 configured to control the electric motor 54 of the airflow unit 50. The control unit 80 is disposed at a mounting part 212 disposed at a top portion of the first airflow pipe 210. The control unit 80 is fixed to the first airflow pipe 210 by the mounting part 212 and the cover member 214 to be screwed to the mounting part 212. The control unit 80 is electrically connected to each of the battery device 12 (see FIG. 1), the trigger 28 (see FIG. 1) and the electric motor 54. When the trigger 28 is operated by the user, the control unit 80 adjusts electric power supplied from the battery device 12 and supplies the same to the electric motor 54 to drive the electric motor 54. In the present embodiment, the control unit 80 is configured to control the electric motor 54 so that the fan 52 generates airflow from the inlet side toward the outlet side along the rotation axis A1.

Figure 5:
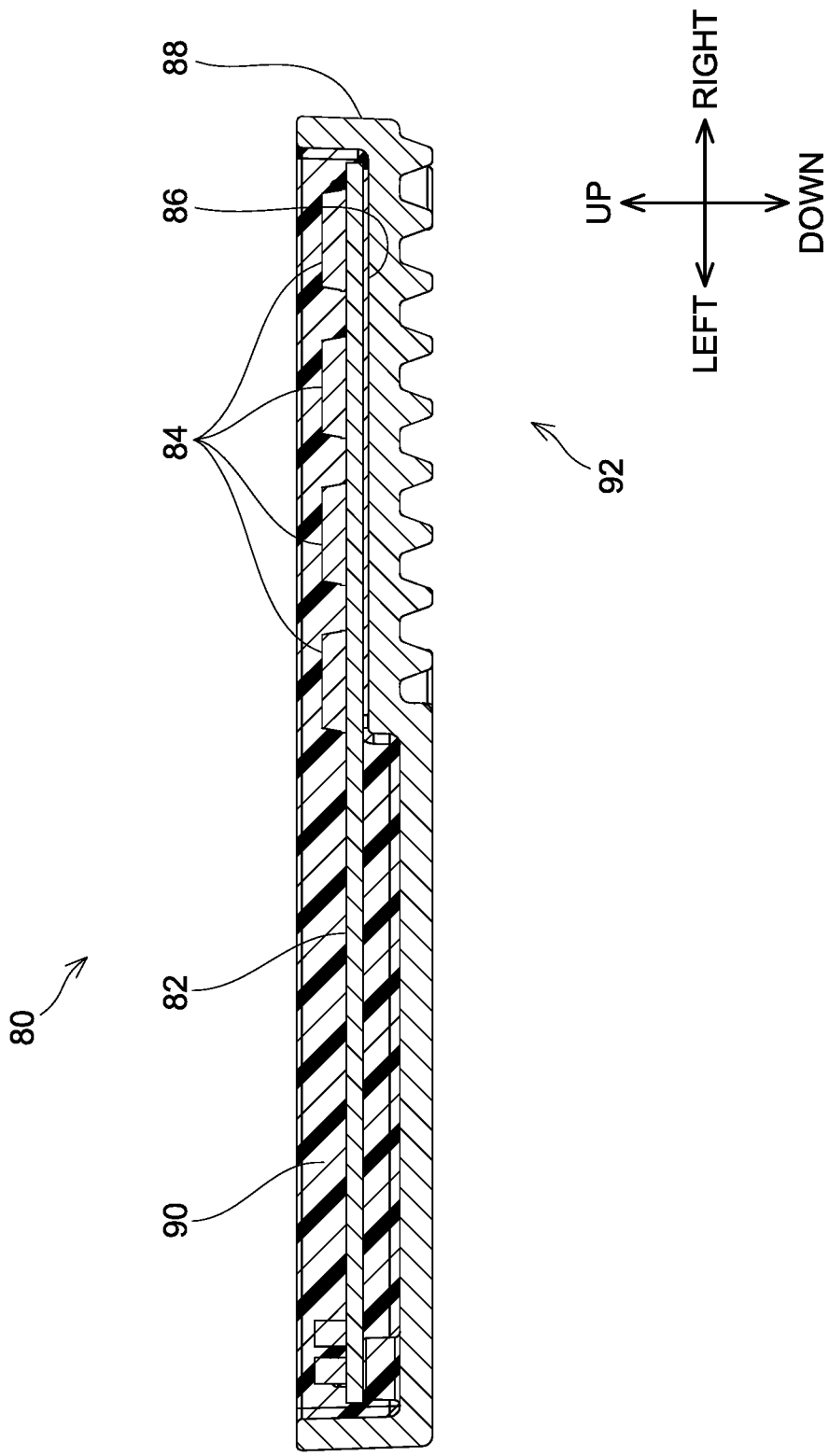
FIG. 5 is a cross-sectional view of components of the control unit 80 included in the blower 10 of the embodiment.

As illustrated in FIG. 5, the control unit 80 includes a control board 82, a plurality of switching elements 84 disposed on the upper surface of the control board 82, heat dissipation members 86 disposed in tight contact with the lower surface of the control board 82, a controller casing 88 that houses the control board 82, the plurality of switching elements 84 and the heat dissipation members 86, and potting resin 90 that seals the control board 82, the plurality of switching elements 84 and the heat dissipation members 86. The heat dissipation members 86 are also in tight contact with the upper surface of the controller casing 88. The controller casing 88 includes a plurality of fins 92 at a part of its lower surface. The plurality of switching elements 84 is disposed above a portion of the controller casing 88 where the plurality of fins 92 is disposed. In the present embodiment, a sheet-shaped aluminum alloy is used for the heat dissipation members 86. In the present embodiment, a metallic material such as aluminum is used for the controller casing 88. In the present embodiment, the plurality of switching elements 84 is FETs (field effect transistors) and constitutes an inverter circuit. Thus, the control unit 80 is configured to convert direct power supplied from the battery device 12 (see FIG. 1) to three-phase alternating power and supply the same to the electric motor 54.

As illustrated in FIG. 4, an upper portion of the first airflow pipe 210 comprises an exposure hole 216 connecting the inside and the outside of the first airflow pipe 210 such that they are in communication in the radial direction of the first airflow pipe 210. The exposure hole 216 is offset from the fan 52 toward the outlet side. The control unit 80 is attached to the first airflow pipe 210 such that a part of the controller casing 88 covers the entirety of the exposure hole 216 from outside in the radial direction of the first airflow pipe 210. With the control unit 80 attached to the first airflow pipe 210, a part of the lower surface of the controller casing 88 where the plurality of fins 92 is disposed (see FIG. 5) is exposed to the airflow path R1 (see FIG. 8) to be described later.

Figure 6:
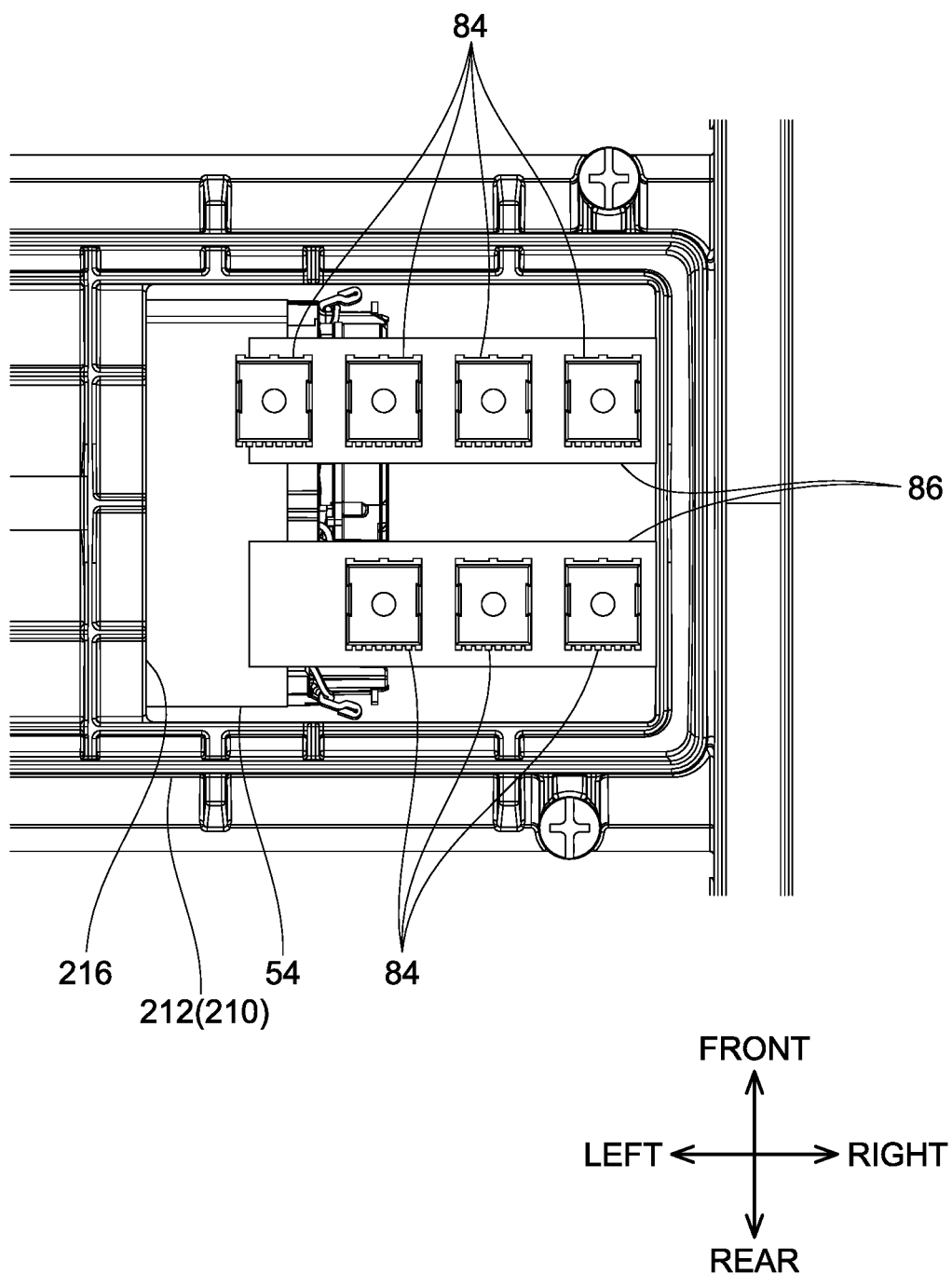
FIG. 6 is a view illustrating positional relationships of an electric motor 54, a plurality of switching elements 84, heat dissipation members 86, a mounting part 212 and an exposure hole 216 when the first airflow pipe 210 of the blower 10 of the embodiment is viewed in an up-down direction from outside in a radial direction.

As illustrated in FIG. 6, in the present embodiment, a part of the electric motor 54, the plurality of switching elements 84 and the heat dissipation members 86 are disposed such that these members and the exposure hole 216 overlap when the exposure hole 216 is viewed along the up-down direction from the outside of the first airflow pipe 210 in the radial direction. It should be noted that, in FIG. 6, components except the electric motor 54, the plurality of switching elements 84, the heat dissipation members 86, the mounting part 212 (the first airflow pipe 210) and the exposure hole 216 are omitted for clearer explanation.

Figure 7:
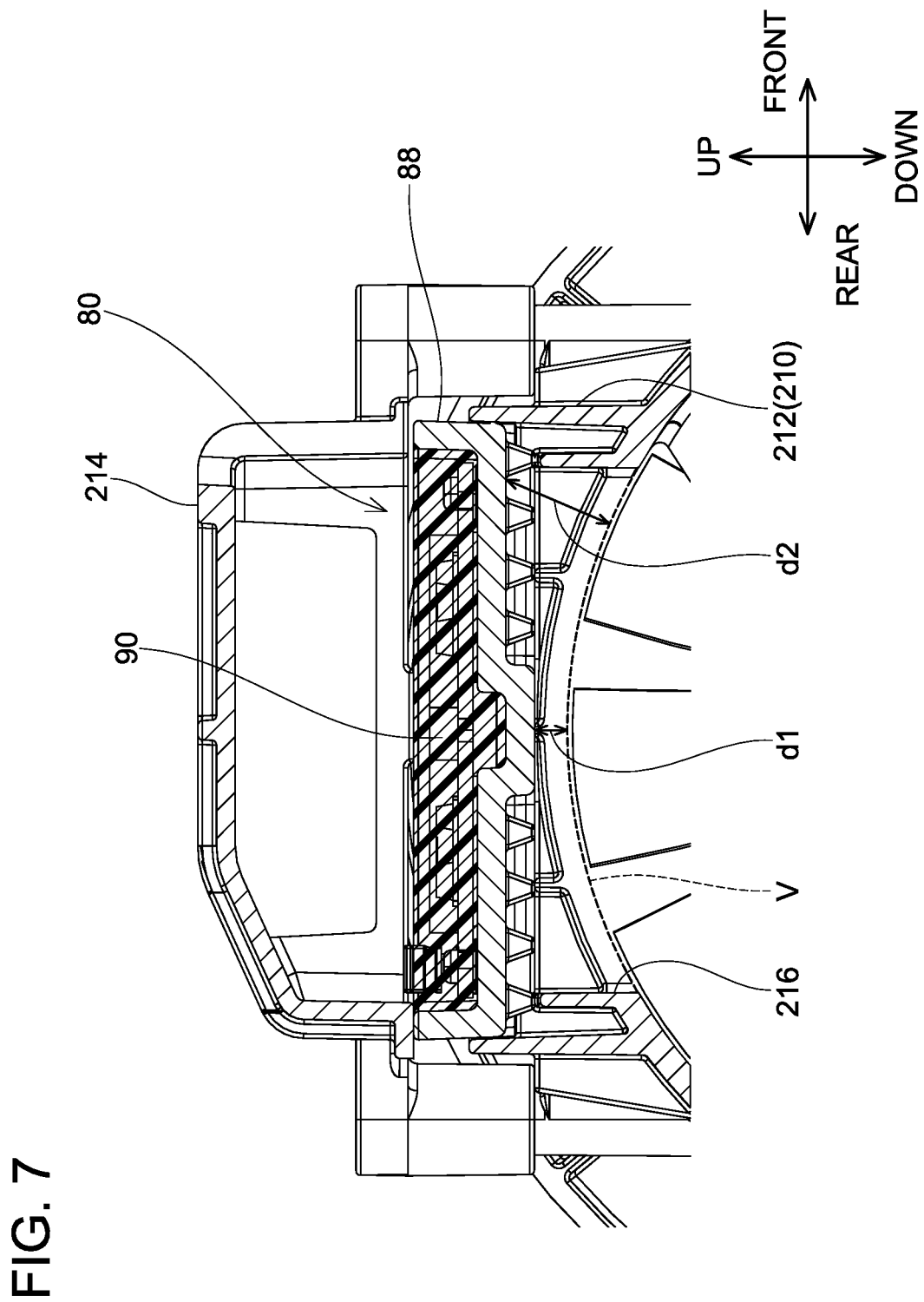
FIG. 7 is a cross-sectional view illustrating positional relationships between a virtual surface V extending along an inner surface of the first airflow pipe 210 and a lower surface of a controller casing 88 in the blower 10 of the embodiment.

As illustrated in FIG. 7, the lower surface of the controller casing 88 has a substantially planar shape extending along the front-rear and left-right directions. The lower surface of the controller casing 88 is offset outwardly in the radial direction of the first airflow pipe 210 from a virtual surface V. The virtual surface V extends along the inner surface of the first airflow pipe 210 at a part where the exposure hole 216 is defined. In the radial direction of the first airflow pipe 210, a minimum distance d1 between the lower surface of the controller casing 88 and the virtual surface V is 2 mm. In the radial direction of the first airflow pipe 210, a maximum distance d2 between the lower surface of the controller casing 88 and the virtual surface V is 12 mm.

Airflow Path R1

Figure 8:
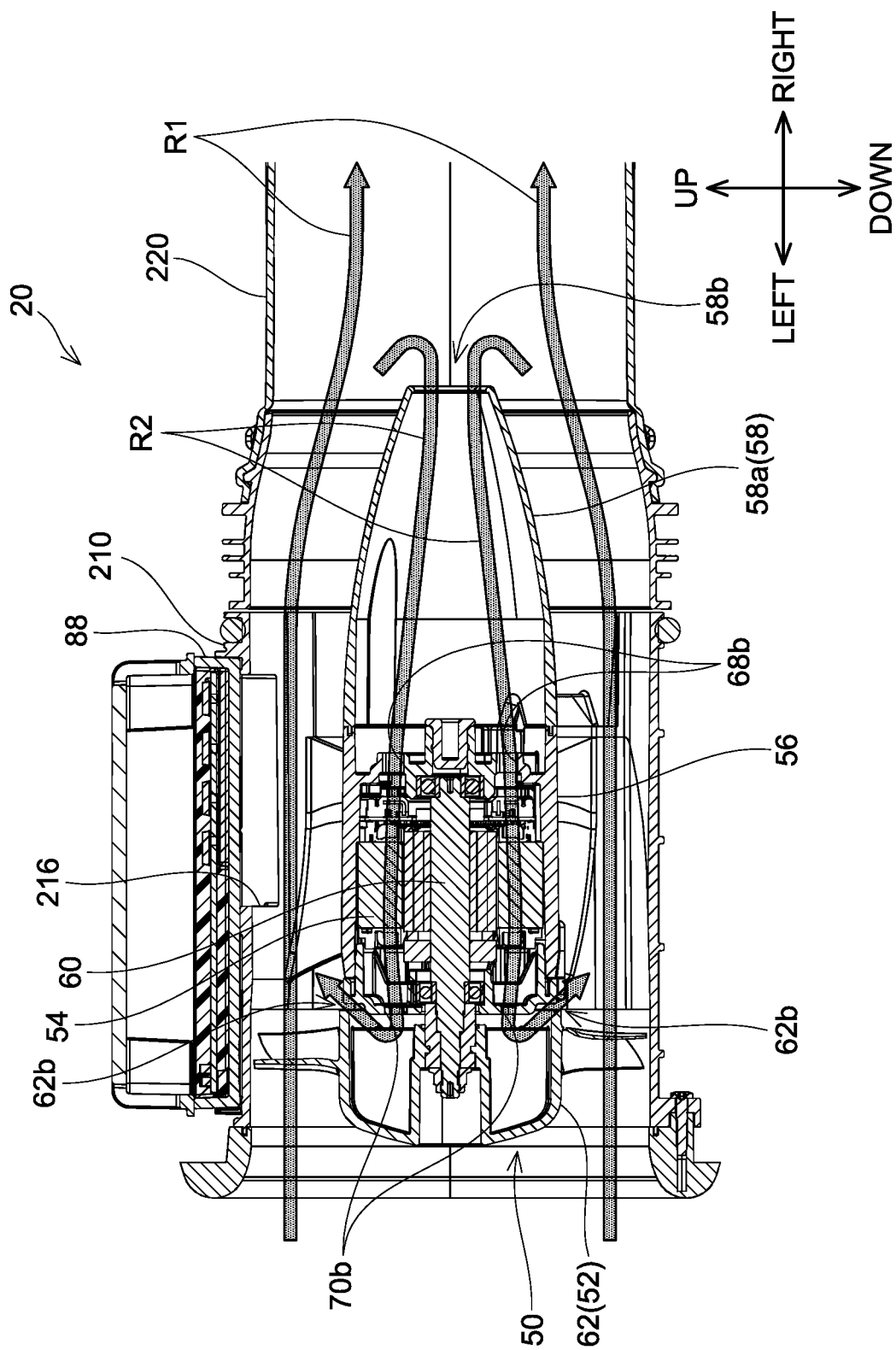
FIG. 8 is a view illustrating an airflow path R1 defined in the first airflow pipe 210 and a circulation path R2 defined in the airflow unit 50 in the blower 10 of the embodiment.

As illustrated in FIG. 8, the airflow path R1 which extends from the left end of the first airflow pipe 210 to the second airflow pipe 220 passing through the outside of the hub 62, the outside of the motor housing 56 and the outside of the diffuser cone 58 in this order is defined in the airflow pipe 20. Although not illustrated, after reaching the second airflow pipe 220, the airflow path R1 further passes through the third airflow pipe 230 (see FIG. 2) and the fourth airflow pipe 240 (see FIG. 2) and then reaches the outlet 32 (see FIG. 2). In the blower 10 of the present embodiment, when the fan 52 generates airflow from the inlet side toward the outlet side, air from the inlet 30 flows to the outlet 32 through the outside of the hub 62, the outside of the motor housing 56 and the outside of the diffuser cone 58 in the airflow path R1.

As described above, the plurality of fins 92 (see FIG. 5) of the controller casing 88 which covers the exposure hole 216 is exposed to the airflow path R1. Thus, the air flowing along the airflow path R1 guides the heat dissipated from the plurality of fins 92 exposed to the airflow path R1 to the outlet 32. In other words, the air flowing along the airflow path R1 is used as cooling air which suppresses temperature rise in the control unit 80. In the blower 10 of the present embodiment, all the air used as the cooling air is exhausted from the outlet 32. Thus, in the blower 10 of the present embodiment, the control unit 80 can be cooled without reducing the flow rate of blowing air.

Circulation Path R2

A circulation path R2 which extends from the airflow path R1 and goes back to the airflow path R1 through the first vent 58b, the inside of the diffuser cone 58, the first communication holes 68b, the inside of the motor housing 56, the second communication holes 70b, the inside of the hub 62 and the second vent 62b in this order is defined in the airflow unit 50. In the circulation path R2, the air flowing in the airflow path R1 flows into the diffuser cone 58 through the first vent 58b, flows through the inside of the motor housing 56, and flows toward the airflow path R1 through the second vent 62b.

Figure 9:
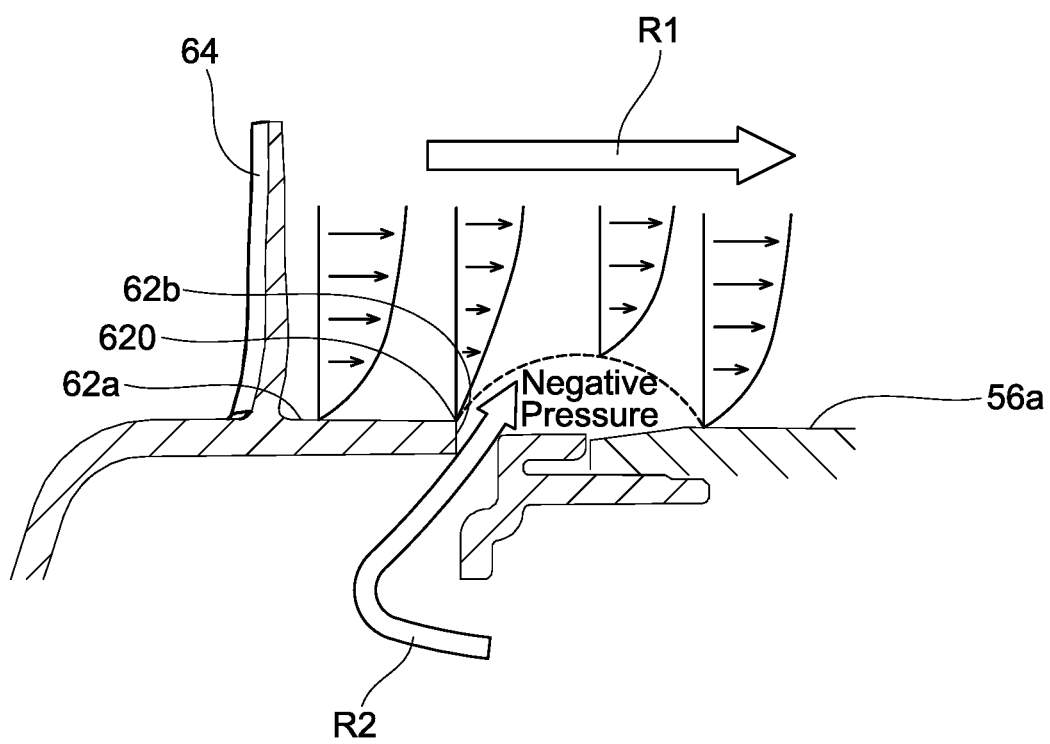
FIG. 9 is a view schematically illustrating how negative pressure which takes air out of the circulation path R2 toward the airflow path R1 when the air flows along the airflow path R1 in the blower 10 of the embodiment.

As illustrated in FIG. 9, when the air flows along the airflow path R1, the air flowing along the first outer surface 62a separates from the first outer surface 62a at the outlet-side end 620, by which negative pressure which takes the air out of the circulation path R2 toward the airflow path R1 is generated at the second vent 62b. On this occasion, as illustrated in FIG. 8, negative pressure which takes the air into the circulation path R2 from the airflow path R1 is generated at the first vent 58b. As described above, when the air flows along the airflow path R1, a part of the air flowing along the airflow path R1 flows along the circulation path R2. The air flowing along the circulation path R2 guides the heat generated in the electric motor 54 housed in the motor housing 56 toward the airflow path R1. In other words, the air flowing along the circulation path R2 is used as cooling air which suppresses temperature rise in the electric motor 54.

Negative Pressure Increasing Mechanism in Vicinity of Second Vent 62b

Figure 10:
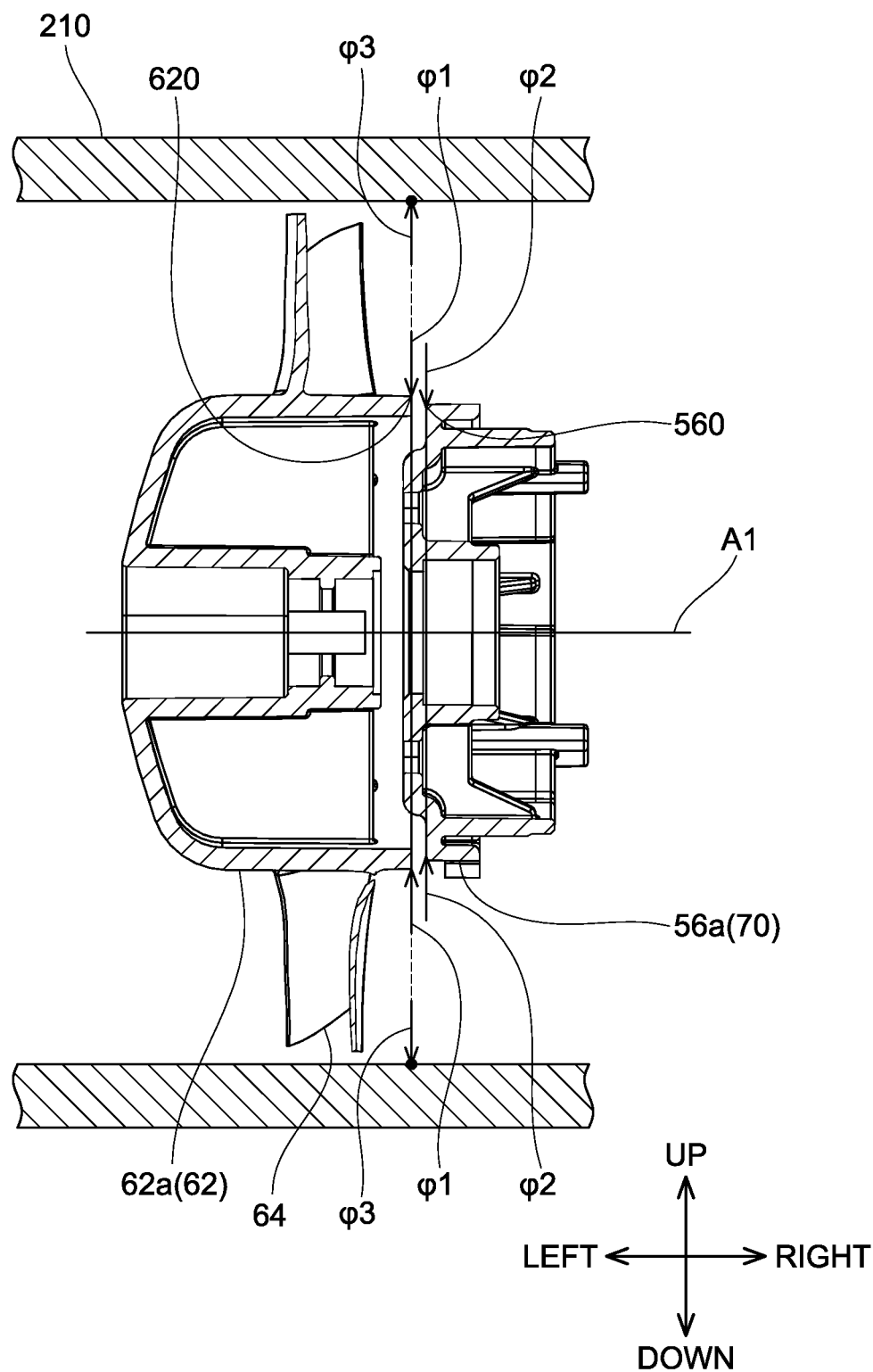
FIG. 10 is a cross-sectional view illustrating a first outer diameter $\varphi 1$ of an outlet-side end 620 of a hub 62, a second outer diameter $\varphi 2$ of an inlet-side end 560 of a motor housing 56 and a first inner diameter $\varphi 3$ of the first airflow pipe 210 in the blower 10 of the embodiment.

As illustrated in FIG. 10, in the present embodiment, the first outer diameter φ1 of the outlet-side end 620 of the hub 62 is larger than the second outer diameter φ2 of the inlet-side end 560 of the motor housing 56. As described above, each of the hub 62 and the motor housing 56 has an axisymmetric shape about the rotation axis A1 of the drive shaft 60, thus the inlet-side end 560 is offset inward in the radial direction of the rotation axis A1 from the outlet-side end 620. Consequently, a distance from a point at which the air flowing along the first outer surface 62a separates from the first outer surface 62a (i.e., separation point) to a point at which the separated air attaches again to the second outer surface 56a (i.e., re-attachment point) increases. As a result, negative pressure which generates airflow in the circulation path R2 increases. Thus, in the blower 10 of the present embodiment, the flow rate of the cooling air for cooling the electric motor 54 can be increased.

Ratio φ1/φ2 of First Outer Diameter φ1 to Second Outer Diameter φ2

Figure 11:
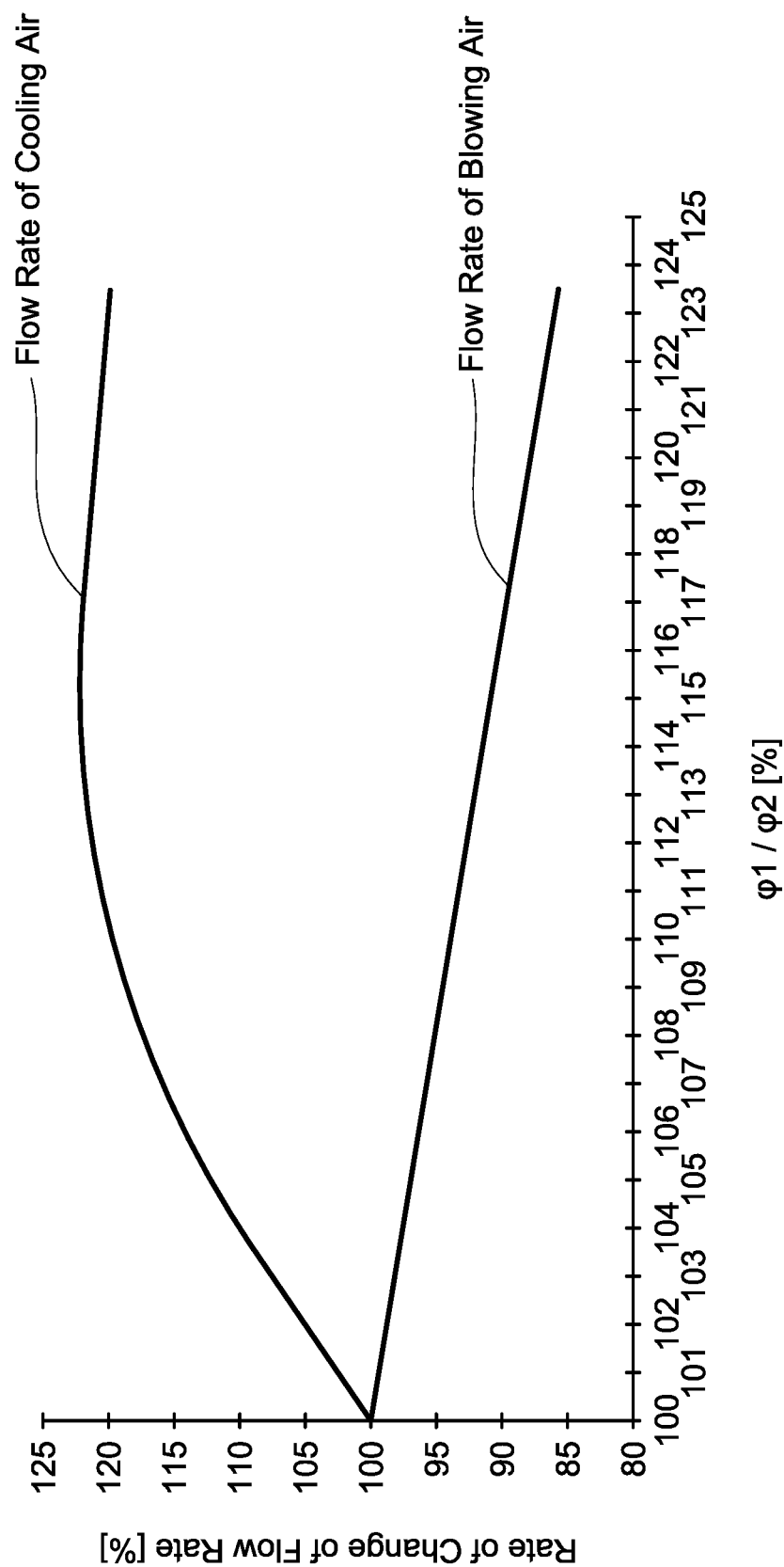
FIG. 11 is a graph indicating a relationship between a ratio $\varphi 1/\varphi 2$ of the first outer diameter $\varphi 1$ to the second outer diameter $\varphi 2$ and a rate of change of each of a flow rate of cooling air and a flow rate of blowing air when the fan 52 is rotated at a constant rotation speed in the blower 10 of the embodiment.

As illustrated in FIG. 11, the flow rate of the cooling air for cooling the electric motor 54 (flow rate of the cooling air) and the flow rate of the blowing air change depending on a ratio φ1/φ2 of the first outer diameter φ1 to the second outer diameter φ2. The flow rate of the cooling air monotonically increases when the ratio φ1/φ2 of the first outer diameter φ1 to the second outer diameter φ2 increases from 100% to 115%, while the flow rate of the cooling air monotonically decreases when the ratio φ1/φ2 of the first outer diameter φ1 to the second outer diameter φ2 increases beyond 116%. The flow rate of the blowing air monotonically decreases as the ratio φ1/φ2 of the first outer diameter φ1 to the second outer diameter φ2 increases. Thus, when the ratio φ1/φ2 of the first outer diameter φ1 to the second outer diameter φ2 is within a range of 101% to 116%, decrease in the flow rate of the blowing air can be suppressed while the flow rate of the cooling air is efficiently increased. In FIG. 11, with respect to the rate of change of each of the flow rate of the cooling air and the flow rate of the blowing air when the ratio φ1/φ2 is changed, the rate of change in the case of φ1/φ2 being 100% is indicated as 100%.

In particular, when the ratio φ1/φ2 of the first outer diameter φ1 to the second outer diameter φ2 increases from 100% to 103%, a gradient of the rate of change of the flow rate of cooling air (rate of increase) is relatively large. A gradient of the rate of change of the flow rate of the blowing air (rate of decrease) is substantially constant regardless of the ratio φ1/φ2 of the first outer diameter φ1 to the second outer diameter φ2. Accordingly, when the ratio φ1/φ2 of the first outer diameter φ1 to the second outer diameter φ2 is 103%, it is possible to further increase the flow rate of the cooling air efficiently while further suppressing decrease in the flow rate of the blowing air. For the above reason, in the blower 10 of the present embodiment, the ratio φ1/φ2 of the first outer diameter φ1 to the second outer diameter φ2 is 103%.

Ratio φ3/φ2 of First Inner Diameter φ3 to Second Outer Diameter φ2

As illustrated in FIG. 10, the first airflow pipe 210 has a first inner diameter φ3 radially outside the outlet-side end 620. When the ratio φ3/φ2 of the first inner diameter φ3 to the second outer diameter φ2 is too small, increasing the first outer diameter φ1 narrows the airflow path R1, by which pressure loss may be increased to a great extent in the airflow path R1. On the other hand, when the ratio φ3/φ2 of the first inner diameter φ3 to the second outer diameter φ2 is too large, the airflow generated in the airflow path R1 by driving the fan 52 may be disturbed. In the present embodiment, the ratio φ3/φ2 of the first inner diameter φ3 to the second outer diameter φ2 is 187%. Consequently, increase in pressure loss in the airflow path R1 can be suppressed and also disturbance of the airflow in the airflow path R1 can be suppressed.

Ratio φ4/φ2 of Second Inner Diameter φ4 to Second Outer Diameter φ2

Further, when the ratio φ4/φ2 of the second inner diameter φ4 of the first vent 58b (see FIG. 12) to the second outer diameter φ2 is too small, an amount of air taken into the circulation path R2 at the first vent 58b may be excessively small. On the other hand, when the ratio φ4/φ2 of the second inner diameter φ4 to the second outer diameter φ2 is too large, the amount of air taken into the circulation path R2 at the first vent 58b may be excessively large. In the present embodiment, the ratio φ4/φ2 of the second inner diameter φ4 to the second outer diameter φ2 is 33%. Consequently, the amount of air taken into the circulation path R2 at the first vent 58b can be a suitable amount.

Variants

In the above embodiments, the configuration in which the blower 10 is a backpack blower was described. In another embodiment, the blower 10 may be a blower other than a backpack blower. For example, the blower 10 may be a handheld blower or the like.

In the above embodiment, the configuration in which the blower 10 includes the battery device 12 connected to the blower body 13 via the discharging cable 26 and electric power is supplied from the battery device 12 to the electric motor 54 was described. In another embodiment, instead of the battery device 12, the blower 10 may include at least one battery pack (another example of a battery device) which is disposed at the blower body 13 and detachably attached to a battery attachment portion (not illustrated) including connection terminal(s). When the at least one battery pack is attached to the battery attachment portion, electric power may be supplied from the at least one battery pack to the electric motor 54. In yet another embodiment, instead of the battery device 12, the blower 10 may include a power supply cord for connecting the blower body 13 to an external power source, and the blower 10 may be configured such that electric power is supplied from the external power source to the electric motor 54 via the power supply cord.

In the above embodiment, the configuration in which the airflow pipe 20 includes the first airflow pipe 210, the second airflow pipe 220, the third airflow pipe 230 and the fourth airflow pipe 240 was described. In another embodiment, the airflow pipe 20 may not include at least one of the second airflow pipe 220, the third airflow pipe 230 and the fourth airflow pipe 240.

In the above embodiment, the configuration in which the electric motor 54 is a brushless motor was described. In another embodiment, the electric motor 54 may be a motor other than a brushless motor. For example, the electric motor 54 may be a brushed motor.

In the above embodiment, the configuration in which the fan 52 is an axial flow fan was described. In another embodiment, the fan 52 may be a fan other than an axial flow fan. For example, the fan 52 may be a centrifugal fan such as a sirocco fan.

In the above embodiment, the configuration in which the hub 62 is fixed to the drive shaft 60 was described. In another embodiment, a speed reducer (not illustrated) may be disposed between the hub 62 and the drive shaft 60. In this case, the hub 62 may be fixed to an output shaft different from the drive shaft 60 and the output saft may be coupled to the drive shaft 60 via the speed reducer. In other words, the hub 62 may be rotatably disposed about a rotation axis different from the rotation axis A1 of the drive shaft 60.

In the above embodiment, the configuration in which the cylindrical portion 66, the bottom portion 68, the plurality of support members 72 and the first airflow pipe 210 are seamlessly and integrally formed was described. In another embodiment, at least one of the cylindrical portion 66, the bottom portion 68, the plurality of support members 72 and the first airflow pipe 210 may be formed as separate member(s).

In the above embodiment, the configuration in which resin such as nylon is used for the cylindrical portion 66, the bottom portion 68, the lid portion 70, the plurality of support members 72 and the first airflow pipe 210 was described. In another embodiment, a material other than resin may be used for at least one of the cylindrical portion 66, the bottom portion 68, the lid portion 70, the plurality of support members 72 and the first airflow pipe 210. For example, aluminum or the like may be used for at least one of the cylindrical portion 66, the bottom portion 68, the lid portion 70, the plurality of support members 72 and the first airflow pipe 210.

In the above embodiment, the configuration in which an aluminum alloy is used for the heat dissipation members 86 was described. In another embodiment, a material other than the aluminum alloy may be used for the heat dissipation members 86. For example, silicon rubber or the like may be used for the heat dissipation members 86.

In the above embodiment, the configuration in which a metallic material such as aluminum is used for the controller casing 88 was described. In another embodiment, a material other than a metallic material may be used for the controller casing 88. For example, nylon or the like may be used for the controller casing 88.

In the above embodiment, the configuration in which the exposure hole 216 is defined downstream from (on the outlet side of) the fan 52 and the controller casing 88 is exposed to the airflow path R1 at a position downstream from the fan 52 was described. In another embodiment, the exposure hole 216 may be defined upstream from (on the inlet side of) the fan 52 and the controller casing 88 may be exposed to the airflow path R1 at a position upstream from the fan 52.

In the above embodiment, the configuration in which, when the exposure hole 216 is viewed from the outside of the first airflow pipe 210 in the radial direction, the electric motor 54 and the exposure hole 216 partially overlap was described. In another embodiment, when the exposure hole 216 is viewed from the outside of the first airflow pipe 210 in the radial direction, the electric motor 54 and the exposure hole 216 may not overlap. In this case, the exposure hole 216 may be offset toward the outlet from the electric motor 54 or may be offset toward the inlet from the electric motor 54.

In the above embodiment, the configuration in which the lower surface of the controller casing 88 has a substantially planar shape was described. In another embodiment, the lower surface of the controller casing 88 may not have a substantially planar shape. For example, the lower surface of the controller casing 88 may have a shape along the virtual surface V.

In the above embodiment, the configuration in which the lower surface of the controller casing 88 is offset outwardly in the radial direction of the first airflow pipe 210 from the virtual surface V which extends along the inner surface of the first airflow pipe 210 at a part where the exposure hole 216 is defined was described. In another embodiment, the lower surface of the controller casing 88 may not be offset outwardly in the radial direction of the first airflow pipe 210 from the virtual surface V which extends along the inner surface of the first airflow pipe 210 at a part where the exposure hole 216 is defined. For example, the lower surface of the controller casing 88 may be offset inwardly in the radial direction of the first airflow pipe 210 from the virtual surface V which extends along the inner surface of the first airflow pipe 210 at a part where the exposure hole 216 is defined.

In the above embodiment, the configuration in which the mounting part 212 and the exposure hole 216 are disposed at an upper portion of the first airflow pipe 210 and the control unit 80 is attached to the upper portion of the first airflow pipe 210 was described. In another embodiment, the mounting part 212 and the exposure hole 216 may be disposed at a position other than the upper portion of the first airflow pipe 210 and the control unit 80 may be attached to a portion other than the upper portion of the first airflow pipe 210. For example, the mounting part 212 and the exposure hole 216 may be disposed at, for example, a lower portion of the first airflow pipe 210, and the control unit 80 may be attached to, for example, the lower portion of the first airflow pipe 210.

In the above embodiment, the configuration in which the plurality of switching elements 84 is FETs was described. In another embodiment, the plurality of switching elements 84 may be switching elements other than FETs. For example, the plurality of switching elements 84 may be IGBTs (insulated-gate bipolar transistors) or the like.

In the above embodiment, the configuration in which the ratio $\varphi1/\varphi2$ of the first outer diameter $\varphi1$ to the second outer diameter $\varphi2$ is 103% was described. In another embodiment, the ratio $\varphi1/\varphi2$ of the first outer diameter $\varphi1$ to the second outer diameter $\varphi2$ may be suitably changed within a range from 101% to 116%.

In the above embodiment, the configuration in which the ratio $\varphi3/\varphi2$ the first inner diameter $\varphi3$ to the second outer diameter $\varphi2$ is 187% was described. In another embodiment, the ratio $\varphi3/\varphi2$ of the first inner diameter $\varphi3$ to the second outer diameter $\varphi2$ may be suitably changed within a range from 175% to 195%.

In the above embodiment, the configuration in which the ratio $\varphi4/\varphi2$ of the second inner diameter $\varphi4$ to the second outer diameter $\varphi2$ is 33% was described. In another embodiment, the ratio $\varphi4/\varphi2$ of the second inner diameter $\varphi4$ to the second outer diameter $\varphi2$ may be suitably changed within a range from 15% to 50%.

Figure 13:
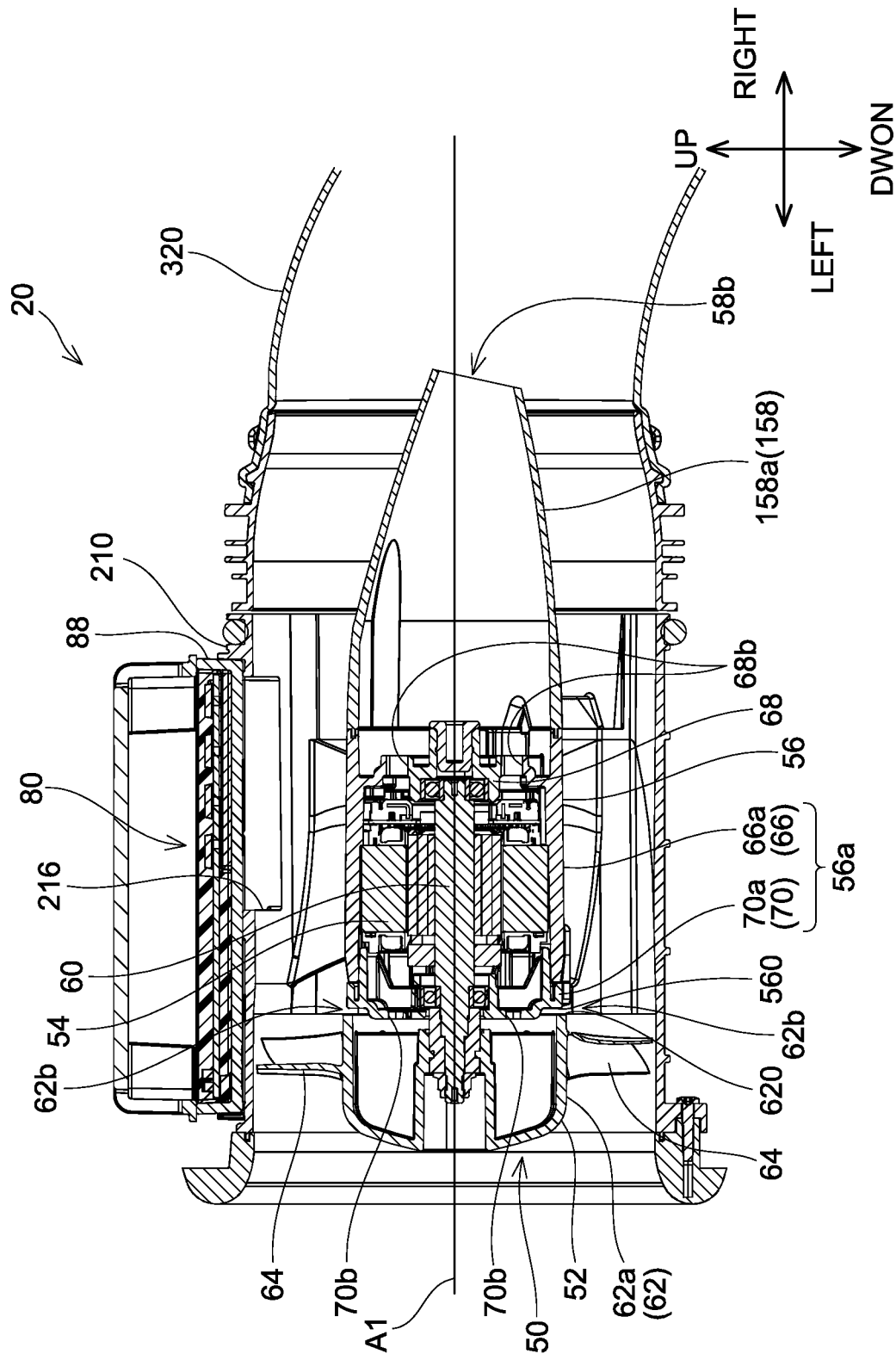
FIG. 13 is a cross-sectional view illustrating internal structures of a first airflow pipe 210, an airflow unit 50 and a control unit 80 of a blower 10 of a variant.

As illustrated in FIG. 13, in another embodiment, the blower 10 may include a second airflow pipe 320 instead of the second airflow pipe 220, and may include a diffuser cone 158 instead of the diffuser cone 58. The second airflow pipe 320 has a shape which curves downward as it extends rightward. The diffuser cone 158 has a shape which curves downward as it extends rightward along the curve shape of the second airflow pipe 320. In this case, the first vent 58b opens along the direction in which the second airflow pipe 320 extends.

Figure 14:
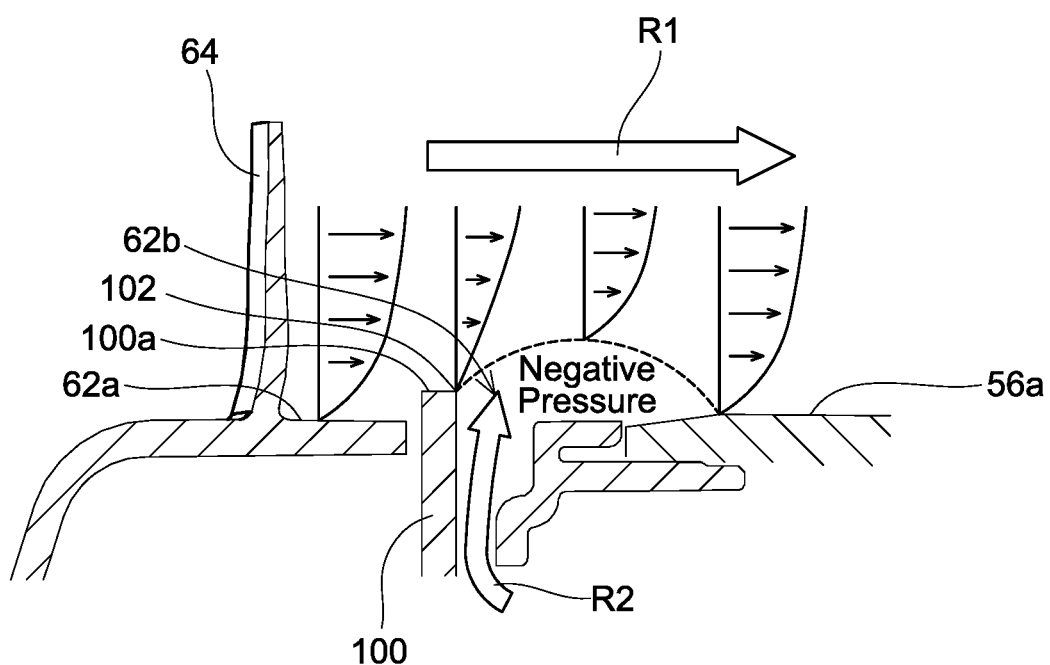
FIG. 14 is a view schematically illustrates how negative pressure which takes air out of a circulation path R2 toward an airflow path R1 is generated when the air flows along the airflow path R1 in the blower 10 of the variant.

As illustrated in FIG. 14, in another embodiment, a plate member 100 having a circular plate shape may be disposed between the hub 62 and the motor housing 56. The plate member 100 may include an outer surface 100a having an axisymmetric shape about the rotation axis A1. The plate member 100 may be fixed to the drive shaft 60 (see FIG. 4) independently from the hub 62. The second vent 62b may not be defined such that its circumferential end is constituted of the outlet-side end 620 of the hub 62 and the inlet-side end 560 of the motor housing 56. Instead, the second vent 62b may be defined such that its circumferential end is constituted of the inlet-side end 560 and an outlet-side end 102 which is the end of the outer surface 100a of the plate member 100 on the outlet side. Although not illustrated, the outer diameter of the outlet-side end 102 may be larger than the second outer diameter $\varphi2$ of the inlet-side end 560. In this configuration, the first outer diameter $\varphi1$ of the outlet-side end 620 may be equal to or greater than the second outer diameter $\varphi2$ of the inlet-side end 560. In this case, the plate member 100 increases negative pressure which generates airflow in the circulation path R2. In other words, the plate member 100 increases the flow rate of the cooling air for cooling the electric motor 54.

Corresponding Relationships

As described above, in one or more embodiments, the blower 10 comprises the inlet 30, the outlet 32, the airflow pipe 20 (specifically, the first airflow pipe 210) disposed between the inlet 30 and the outlet 32, the fan 52 disposed in the airflow pipe 20, the electric motor 54 disposed in the airflow pipe 20 and configured to drive the fan 52, the motor housing 56 that is disposed in the airflow pipe 20 and houses the electric motor 54, and the control unit 80 configured to control the electric motor 54. The control unit 80 comprises the control board 82 configured to control the electric motor 54 and the controller casing 88 (an example of a casing) that houses the control board 82. The airflow pipe 20 comprises the exposure hole 216 connecting the inside of the airflow pipe 20 to the outside of the airflow pipe 20 such that the inside and the outside are in communication in the radial direction. The controller casing 88 is attached to the airflow pipe 20 such that a part of the controller casing 88 (an example of at least part of the casing) covers an entirety of the exposure hole 216 from outside in the radial direction.

According to the above configuration, the controller casing 88 is attached to the airflow pipe 20 such that it covers the entirety of the exposure hole 216. At this time, a part of the controller casing 88 is exposed to the airflow path R1 through the exposure hole 216 defined in the airflow pipe 20. Thus, the air flowing along the airflow path R1 cools the control unit 80, and all the air used for the cooling is exhausted as the blowing air. According to the above configuration, it is not necessary to provide a cooling air path for cooling the control unit 80 separately from the airflow path R1, and thus a structure of the blower 10 can be simplified and the blower 10 can be downsized.

In one or more embodiments, the airflow pipe 20 and the motor housing 56 are constituted of resin. An entirety of the controller casing 88 (an example of at least part of the casing) is constituted of a metallic material.

In order to efficiently cool the control unit 80, it is desirable to use a material having high heat conductivity for a portion of the controller casing 88 housing the control board 82, the portion being exposed to the airflow path R1. On the other hand, in order to reduce a mass of the blower 10 as a whole, it is desirable to use a material having a small mass for the airflow pipe 20 and the motor housing 56. According to the above configuration, the at least part of the controller casing 88 exposed to the airflow path R1 is constituted of a metallic material having high heat conductivity. The airflow pipe 20 and the motor housing 56 are constituted of resin having a small mass. Consequently, the control unit 80 can efficiently be cooled and also reduction of a weight of the blower 10 as a whole can be achieved.

In one or more embodiments, the portion of the controller casing 88 exposed to the airflow path R1 (an example of at least part of the casing) is offset outwardly in the radial direction from the virtual surface V, in which the virtual surface V extends along the inner surface of the airflow pipe 20 at the part where the exposure hole 216 is defined.

When the controller casing 88 is offset inwardly from the virtual surface V in the radial direction of the airflow pipe 20, the airflow path R1 is narrowed at the part where the controller casing 88 is disposed, thus there is a risk that pressure loss increases in the airflow path R1. According to the above configuration, the airflow path R1 will not be narrowed at the part where the controller casing 88 is disposed. Consequently, increase in pressure loss in the airflow path R1 can be suppressed.

In one or more embodiments, in the radial direction, the minimum distance d1 between the part of the controller casing 88 exposed to the airflow path R1 and the virtual surface V is 2 mm and the maximum distance d2 therebetween is 12 mm (an example of a distance between the at least part of the casing and the virtual surface being within a range of 2 mm to 12 mm).

In general, when the distance between the controller casing 88 and the virtual surface V is smaller, the control unit 80 can more efficiently be cooled by the air flowing in the airflow path R1. According to the above configuration, the control unit 80 can efficiently be cooled.

In one or more embodiments, when the exposure hole 216 is viewed from outside in the radial direction, the electric motor 54 and the exposure hole 216 partially (an example of at least partially) overlap.

For example, if the electric motor 54 and the exposure hole 216 do not overlap when the exposure hole 216 is viewed from outside in the radial direction, the airflow pipe 20 may become excessively long. According to the above configuration, the electric motor 54 and the exposure hole 216 are arranged such that they at least partially overlap when the exposure hole 216 is viewed from outside in the radial direction, thus the airflow pipe 20 can be shortened.

In one or more embodiments, the fan 52 is an axial flow fan whose blowing direction is along the rotation axis of the fan 52. The rotation axis A1 of the fan 52 is arranged along the left-right direction (an example of a direction in which the airflow pipe extends). The control board 82 is configured to control the electric motor 54 so that the upstream side of the blowing direction of the fan 52 is the inlet side and the downstream side of the blowing direction of the fan 52 is the outlet side. The exposure hole 216 is disposed downstream from the fan 52.

In general, the flow rate of air flowing in the airflow path R1 is greater on the downstream side than on the upstream side from the fan 52. According to the above configuration, the controller casing 88 of the control unit 80 is exposed to the airflow path R1 at a position downstream from the fan 52. Thus, air having a relatively large flow rate flows at the part where the control unit 80 is exposed to the airflow path R1. According to the above configuration, the control unit 80 can efficiently be cooled.

In one or more embodiments, the electric motor 54 is a brushless motor. The control board 82 comprises the plurality of switching elements 84 configured to control current supplied to the electric motor 54.

In general, when the electric motor 54 is a brushless motor, the plurality of switching elements 84 configured to control current supplied to the brushless motor is disposed on the control board 82. In this case, due to heat generation by the plurality of switching elements 84, an amount of heat generated by the control unit 80 relatively increases. According to the above configuration, in the blower 10 including a brushless motor, the control unit 80 can efficiently be cooled without reducing the flow rate of the blowing air.

In one or more embodiments, when the exposure hole 216 is viewed from outside in the radial direction, all of the plurality of switching elements 84 and the exposure hole 216 overlap (an example of a plurality of switching elements and the exposure hole at least partially overlapping).

According to the above configuration, all the plurality of switching elements 84, which is the parts whose heat generation amount is relatively large within the control unit 80, and the exposure hole 216 overlap in the radial direction of the airflow pipe 20. Thus, the heat generated by the plurality of switching elements 84 tends to be dissipated to the part of the controller casing 88 exposed to the airflow path R1. Consequently, temperature increase in the control unit 80 as a whole can efficiently be suppressed. According to the above configuration, the control unit 80 including the plurality of switching elements 84 can efficiently be cooled.

What is claimed is:
1. A blower, comprising:
an inlet;
an outlet;
an airflow pipe disposed between the inlet and the outlet, wherein the inlet and the outlet are coaxial with each other;
a fan disposed in the airflow pipe;
an electric motor disposed in the airflow pipe and configured to drive the fan so that air flows in a direction along an air flow path extending from the inlet to the outlet in an axial direction of the airflow pipe;
a motor housing that is disposed in the airflow pipe and houses the electric motor; and
a control unit configured to control the electric motor, wherein the control unit comprises:
a control board configured to control the electric motor; and
a casing that houses the control board, wherein the casing includes a lower surface that has a shape extending along a front-rear direction and a left-right direction of the casing,
the airflow pipe comprises an exposure hole connecting an inside of the airflow pipe to an outside of the airflow pipe such that the inside and the outside are in communication in a radial direction,
the lower surface of the casing is longer than the exposure hole in both the front-rear direction and the left-right direction, and
the casing is attached to a mounting part of the airflow pipe such that at least a part of the casing covers an entirety of the exposure hole from the outside in the radial direction, so that, when the fan is driven, the part of the casing is exposed to the air that flows along the air flow path.

2. The blower according to claim 1, wherein the airflow pipe and the motor housing are constituted of resin, and the part of the casing is constituted of a metallic material.

3. The blower according to claim 1, wherein the part of the casing is offset outwardly in the radial direction from a virtual surface, wherein the virtual surface extends along an inner surface of the airflow pipe at a part of the airflow pipe where the exposure hole is defined.

4. The blower according to claim 3, wherein, in the radial direction, a distance between the part of the casing and the virtual surface is within a range of 2 mm to 12 mm.

5. The blower according to claim 1, wherein when the exposure hole is viewed from the outside in the radial direction, the electric motor and the exposure hole at least partially overlap.

6. The blower according to claim 1, wherein the fan is an axial flow fan whose blowing direction is along a rotation axis of the fan,
the rotation axis of the fan is arranged along a direction in which the airflow pipe extends,
the control board is configured to control the electric motor so that an upstream side of the blowing direction is on an inlet side and a downstream side of the blowing direction is on an outlet side, and
the exposure hole is disposed downstream from the fan.

7. The blower according to claim 1, wherein the electric motor is a brushless motor, and
the control board comprises a plurality of switching elements configured to control current supplied to the electric motor.

8. The blower according to claim 7, wherein when the exposure hole is viewed from the outside in the radial direction, the plurality of switching elements and the exposure hole at least partially overlap.

9. The blower according to claim 2, wherein the part of the casing is offset outwardly in the radial direction from a virtual surface, wherein the virtual surface extends along an inner surface of the airflow pipe at a part of the airflow pipe where the exposure hole is defined,
in the radial direction, a distance between the part of the casing and the virtual surface is within a range of 2 mm to 12 mm,
when the exposure hole is viewed from the outside in the radial direction, the electric motor and the exposure hole at least partially overlap,
the fan is an axial flow fan whose blowing direction is along a rotation axis of the fan,
the rotation axis of the fan is arranged along a direction in which the airflow pipe extends,
the control board is configured to control the electric motor so that an upstream side of the blowing direction is on an inlet side and a downstream side of the blowing direction is on an outlet side,
the exposure hole is disposed downstream from the fan,
the electric motor is a brushless motor,
the control board comprises a plurality of switching elements configured to control current supplied to the electric motor, and
when the exposure hole is viewed from the outside in the radial direction, the plurality of switching elements and the exposure hole at least partially overlap.

* * * * *